3,364,260
4N-DEMETHYL-4N-ETHYL TETRACYCLINES
Saul L. Neidleman, Highland Park, N.J., assignor, by mesne assignments, to E. R. Squibb & Sons, Inc., a corporation of Delaware
No Drawing. Filed May 6, 1963, Ser. No. 278,400
3 Claims. (Cl. 260—559)

This invention relates to the production of 4N-demethyl-4N-ethyl tetracyclines. More particularly, the invention relates to the new antibiotics 4N-demethyl-4N-ethyltetracycline, 4N-demethyl-4N-ethyl-7-(halo)-tetracycline, for example 4N - demethyl - 4N - ethylchlortetracycline and 4N-demethyl-4N-ethylbromtetracycline, 4N-demethyl - 4N - ethyl-6-demethyltetracycline, and 4N-demethyl-4N-ethyl-6-demethyl-7-(halo)tetracycline, for example 4N-demethyl-4N-ethyl-6-demethylchlortetracycline, and 4N - demethyl-4N-ethyl-6-demethylbromtetracycline, and to methods of producing these compounds by microbiological means.

The compounds of this invention are produced by culturing strains of the microorganism *Streptomyces aureofaciens* in a fermentation medium under aerobic conditions.

The conditions of fermentation are generally the same as the conventional methods of producing tetracyclines by fermentation. The fermentation medium contains the usual nutrients and mineral sources supplying carbon, nitrogen and energy to the developing culture. Suitable nutrients include, for example, carbohydrates such as starch, dextrose, sucrose, glucose, molasses, and nitrogen sources such as soybean meal, yeast, meat extracts, corn steep liquor, distillers solubles, inorganic salts such as calcium carbonate, ammonium sulfate as well as trace elements and other conventional substances.

The inoculum employed for producing the 4N-demethyl-4N-ethyl(halo)tetracyclines in the practice of this invention is prepared by suspending a sterile lyophilized pellet of the microorganism being employed in a sterile medium of the following composition (A) in flasks or bottles:

| | Gm./liter |
|---|---|
| Soybean meal (extraction process) | 30 |
| Calcium carbonate (powdered) | 7 |
| Alkali metal halide salt | 1 |
| Glucose | 50 |

Distilled water to make 1 liter.

Growth of the inoculum in 50 ml. of medium A in a 250 ml. flask is carried out at about 25° C. on a rotary shaker (280 r.p.m., 2″ strokes) for about 72 hours. The above medium may also be employed for fermentation.

The alkali metal halide salts employed in the above medium will depend on the final product sought to be produced. Thus, where 4N-demethyl-4N-ethylchlortetracycline is the final product, salts such as sodium chloride may be used; while 4N - demethyl-4N-ethylbromtetracycline production requires the use of such salts as sodium bromide. It has also been found that when the alkali metal halide salt is omitted entirely from the medium and an equivalent amount of deionized water is substituted for the distilled water, 4N-demethyl-4N-ethyltetracycline is obtained, employing the above medium.

In addition to the ingredients of the foregoing fermentation medium, it is essential, in the production of the 4N-demethyl - 4N - ethyl(halo)tetracyclines and the 4N-demethyl-4N-ethyltetracyclines, to add small amounts of ethionine to and further amounts of a compound selected from the group consisting of cyanocobalamin, methionine, methionine sulfoxide and threonine. The amount of ethionine, which may be DL-, D- or L-ethionine, employed in the practice of this invention may vary from 50 to 1000 mg. per liter and is preferably about 100 to 200 mg./liter. The amounts of the other compounds which are employed in combination with the ethionine may vary from about 200 to about 1000 mg./liter and are preferably about 500 to about 1500 mg./liter for methionine, methionine sulfoxide and threonine; and for cyanocobalamine from about 10 to 50 mg./liter and preferably about 20 to 40 mg./liter.

The microorganisms employed in producing the 4N-demethyl-4N-ethyl(halo)tetracycline and the 4N-demethyl-4N-ethyltetracycline products of this invention are *Streptomyces aureofaciens* ATCC 13900, *S. aureofaciens* ATCC 13899; *S. aureofaciens* ATCC 12416a; *S. aureofaciens* ATCC 12416b; *S. aureofaciens* ATCC 12416c; *S. aureofaciens* NRRL B 1288; *S. aureofaciens* NRRL 2209; *S. aureofaciens* NRRL B 1286; *S. aureofaciens* NRRL B 1287; and *S. viridofaciens* ATCC 11989.

In addition to the foregoing, it has been found that the 4N - demethyl-4N-ethyl-6-demethyltetracyclines and the 4N-demethyl-4N-ethyl-6-demethyl(halo)tetracyclines, for example 4N-demethyl-4N-ethyl-6-demethylchlortetracycline and 4N-demethyl-4N-ethyl-6-demethylbromtetracyclines may also be produced. The inoculum employed for biosynthesis these compounds is prepared by suspending a sterile lyophilized pellet of the microorganism employed in a sterile medium of the following composition (B) in flasks or bottles:

| | | |
|---|---|---|
| Sucrose | gm./liter | 30 |
| (NH$_4$)$_2$SO$_4$ | gm./liter | 2 |
| CaCO$_3$ | gm./liter | 7 |
| Corn steep liquor | ml./liter | 36.5 |

Distilled water to make 1 liter.

Growth of the inoculum in 50 ml. of medium B in a 250 ml. flask is carried out at about 25° C. on a rotary shaker (280 r.p.m.; 2″ stroke) for about 72 hours.

For fermentation, the inoculum is added to a sterile fermentation medium of the following composition (C):

| | | |
|---|---|---|
| Corn starch | gm./liter | 55 |
| CaCO$_3$ | gm./liter | 7 |
| (NH$_4$)$_2$SO$_4$ | gm./liter | 5 |
| FeSO$_4$·7H$_2$O | gm./liter | 40 |
| NH$_4$Cl | gm./liter | 1.5 |
| MnSO$_4$·4H$_2$O | mg./liter | 50 |
| CoCl$_2$·6H$_2$O | mg./liter | 5 |
| ZnSO$_4$·7H$_2$O | mg./liter | 100 |
| Corn steep liquor | gm./liter | 30 |
| Cottonseed meal | gm./liter | 2 |
| Lard oil | percent v./v. | 2 |

Distilled water to make 1 liter.

The fermentation is carried out at about 25° C. for 6 to 7 days, an adequate air supply being continually present.

In order to produce the 4N - demethyl-4N-ethyl-6-demethyltetracycline, the above medium may be employed excepting that the amount of chloride ions present in the medium must be minimized. Thus, if an equivalent amount of soybean meal (extraction process) were substituted for corn steep liquor and (NH$_4$)$_2$SO$_4$ were substituted for the NH$_4$Cl; and CO(NO$_3$)$_2$ were substituted for CoCl$_2$; and deionized water were substituted for the distilled water, 4N-demethyl-4N-ethyl-6-demethyltetracycline is produced. In addition, if 1 gm./liter of NaBr were added to the medium employed in the production of 4N-demethyl - 4N-ethyl-6-demethyltetracycline, there is obtained 4N - demethyl - 4N-ethyl-6-demethylbromtetracycline.

In addition to the components of the above identified fermentation medium (C) a small but effective amount of ethionine must be present. The amount of ethionine which may be D-, L-, or DL-ethionine, which may be used in the practice of this invention may vary from about 50 to 1000 mg. per liter and is preferably from 100 to 500 mg. per liter.

The microorganisms employable to obtain the 4N-demethyl - 4N - ethyl - 6 - demethyltetracyclines and 4N-demethyl-4N-ethyl-6-demethyl(halo)tetracyclines such as 4N-demethyl-4N-ethyl-6-demethylchlortetracycline and 4N-demethyl-4N-ethyl-6-demethylbromtetracycline are *S. aureofaciens* ATCC 12551, *S. aureofaciens* ATCC 12552, *S. aureofaciens* ATCC 12553, and *S. aureofaciens* ATCC 12554.

The 4N-demethyl-4N-ethyl tetracyclines may be separated from the broth by extracting with organic solvents such as ethyl acetate, n-butanol, methyl isobutylketone and the like, then concentrating the rich extract to dryness by evaporization or lyophilization. The products may be further purified by cellulose column chromatography.

The presence of these novel 4N-demethyl-4N-ethyl tetracyclines is demonstrated and distinguished from other teracyclines by paper chromatography employing the methods of Bohonos et al., Antibiotics Annual 1953–4, page 49, or Selzer and Wright, Antibiotics and Chemotherapy, 6, 292 (1956). Their presence may be further demonstrated by use of $CH_3C^{14}H_2$—S—labeled DL-ethionine.

The 4N-demethyl-4N-ethyl tetracyclines of this invention are antibacterial agents useful to combat infections due to gram-positive and gram-negative cocci an bacilli such as pneumococci, streptococci, staphylococci and the like. They may be administered orally or parenterally in conventional dosage forms, with the dosage adjusted for the individual needs of the one treated, in a manner similar to tetracycline.

The following examples are illustrative of the invention. All temperatures are expressed in degrees centigrade.

*Example 1*

(A) *Preparation of the inoculum.*—A steril lyophilized pellet of *S. aureofaciens* ATCC 13900 is transferred to a 250 ml. Erlenmeyer flask containing 50 ml. of sterile medium of the following composition:

| | Gm./liter |
|---|---|
| Soybean meal (extraction process) | 30 |
| NaCl | 1 |
| Glucose | 50 |
| $CaCO_3$ | 7 |

Distilled water to make 1 liter.

and is cultured on a rotary shaker (280 r.p.m.; 2″ stroke) at 25° C. for about 72 hours.

(B) *Fermentation.*—To a tube containing 10 ml. of the above medium is added 1 ml. of DL-ethionine from a sterile solution containing 1 mg./ml. and 1 ml. of cyanocobalamin from a sterile solution containing 400 α/ml. One ml. of the *Streptomyces aureofaciens* ATCC 13900 inoculum, prepared in part A above, is then added to the tube and the tube is then placed on a rotary shaker (280 r.p.m.; 2″ stroke) at about 25° C. for about 168 hours.

(C) *Isolation and identification.*—The fermentation broth of part B above is then acidified to pH 2.0 with $H_2SO_4$, shaken for ten minutes and centrifuged. The supernatant is then chromatographically analyzed in the following chromatographic system: stationary phase, pH 3.0, 0.3 M phosphate buffer; moving phase, dec-butanol saturated with water; on Whatman No. 1 paper to show the presence of 4N-demethyl-4N-ethylchlortetracycline. In addition, it is shown by fluoresence and bioautography with *Staphylococcus aureus* 209 P that 4-N-demethyl-4N-ethyl chlortetracycline is present in addition to 7-chlortetracycline and tetracycline.

*Example 2*

Following the procedure set forth in Example 1 but substituting in the mediums of parts A and B and equivalent amount of sodium bromide for the sodium chloride, there is produced 4N - demethyl - 4N - ethylbromtetracycline.

*Example 3*

Following the procedure set forth in Example 1 but substituting in part B 1 ml. of DL-methionine from a sterile solution containing 10 mg./ml. for the cyanocobalamin there is produced 4N-demethyl-4N-ethylchlortetracycline.

*Example 4*

Following the procedure of Example 3 but substituting 1 ml. of DL-methionine sulfoxide from a sterile solution containing 10 mg./ml. for the DL-methionine, there is produced 4N-demethyl-4N-ethylchlortetracycline.

*Example 5*

Following the procedure of Example 3 but substituting 1 ml. of DL-threonine from a sterile solution containing 10 mg./ml. for the DL-methionine there is produced 4N-demethyl-4N-ethylchlortetracycline.

*Example 6*

(A) *Inoculum.*—A sterile lyophilized pellet of *Streptomyces aureofaciens* ATCC 13900 is transferred to a 250 my. Erlenmeyer flask containing 50 ml. of sterile medium of the following composition:

| | Gm./liter |
|---|---|
| Soybean meal (extraction process) | 30 |
| Glucose | 50 |
| $CaCO_3$ | 7 |

Deionized water to make 1 liter.

and is cultured on a rotary shaker (280 r.p.m.; 2″ stroke) at 25° C. for about 72 hours.

(B) *Fermentation.*—To a tube containing 10 ml. of the above medium is added 1 ml. of DL-ethionine from a sterile solution containing 1 mg./ml. and 1 ml. of cyanocobalamin from a sterile solution containing 400 α/ml. One ml. of the *S. aureofaciens* ATCC 13900 inoculum prepared in part A above is then added to the tube and the tube is then placed on a rotary shaker (280 r.p.m.; 2″ stroke) at about 25° C. for about 168 hours.

The resultant fermentation product is then treated in accordance with the procedures set forth in Example 1, part C, to yield 4N-demethyl-4N-ethyltetracycline.

*Example 7*

(A) *Preparation of the Inoculum*:—A sterile lyophilized pellet of the microorganism *S. aureofaciens*, ATCC 12551, is transferred to a 250 ml. Erlenmeyer flask containing 50 ml. of sterile medium of the following composition:

| | | |
|---|---|---|
| Sucrose | gm./liter | 30 |
| $(NH_4)_2SO_4$ | gm./liter | 2 |
| $CaCO_3$ | gm./liter | 7 |
| Corn steep liquor | ml./liter | 36.5 |

Distilled water to make 1 liter.

and is cultured on a rotary shaker (280 r.p.m.; 2″ stroke) at 25° C. for about 72 hours.

(B) *Fermentation.*—A sterile fermentation medium of the following composition is prepared:

| | | |
|---|---|---|
| Corn starch | gm./liter | 55 |
| $CaCO_3$ | gm./liter | 7 |
| $(NH_4)_2SO_4$ | gm./liter | 5 |
| $FeSO_4.7H_2O$ | gm./liter | 40 |
| $NH_4Cl$ | gm./liter | 1.5 |
| $MnSO_4.4H_2O$ | mg./liter | 50 |
| $CoCl_2.6H_2O$ | mg./liter | 5 |
| $ZnSO_4.7H_2O$ | mg./liter | 100 |
| Corn steep liquor | gm./liter | 30 |
| Cottonseed meal | gm./liter | 2 |
| Lard oil | percent v./v | 2 |

Distilled water to make 1 liter.

The medium is sterilized by autoclaving at 121° C. for 20 minutes.

To a tube containing 10 ml. of the above sterile medium is added 2.5 mg. of sterile DL-ethionine. One ml. of the S. aureofaciens ATCC 12551, inoculum prepared in part A above is added to the tube and the tube is placed on a rotary shaker (280 r.p.m.; 2" stroke) at 25° C. for about 168 hours.

(C) *Isolation and identification.*—The contents of the tube obtained in part B above is acidified to pH 2.0 by the addition of $H_2SO_4$, shaken for about ten minutes, centrifuged and the supernatant liquid chromatographically analyzed in the following chromatographic system: stationary phase, pH, 3.0, 0.3 M, phosphate buffer; moving phase, sec-butanol saturated with water on Whatman No. 1 paper to show the presence of 4N-demethyl-4N-ethyl-6-demethylchlortetracycline.

Similarly, if L-ethionine or D-ethionine are substituted in the procedures set forth in Example 7, for DL-ethionine, 4N-demethyl-4N-ethyl-6-demethylchlortetracycline is also produced.

*Example 8*

A sterile fermentation medium of the following composition is prepared:

| | |
|---|---|
| Corn starch | gm./liter__ 55 |
| $CaCO_3$ | gm./liter__ 7 |
| $(NH_4)_2SO_4$ | gm./liter__ 6 |
| $FeSO_4 \cdot 7H_2O$ | gm./liter__ 40 |
| $MnSO_4 \cdot 4H_2O$ | mg./liter__ 50 |
| $CO(NO_3)_2$ | mg./liter__ 5 |
| $ZnSO_4 \cdot 7H_2O$ | mg./liter__ 100 |
| Soybean meal (extraction process) | gm./liter__ 30 |
| Cottonseed meal | gm./liter__ 2 |
| Lard oil | percent v./v__ 2 |

Deionized water to make 1 liter.

The medium is sterilized by autoclaving at 121° C. for 20 minutes.

To a tube containing 10 ml. of the above sterile medium is added 2.5 mg. of DL-ethionine. One ml. of the S. aureofaciens ATCC 12551 inoculum prepared in Example 7, part A, is added to the tube and the tube is placed on a rotary shaker (280 r.p.m., 2" stroke) at 25° C. for about 168 hours.

The resultant fermentation product is then treated in accordance with the procedures set forth in Example 7, part C, to show the presence of 4N-demethyl-4N-ethyl-6-demethyltetracycline.

*Example 9*

Following the procedures of Example 8 but incorporating in the fermentation medium 1 gm./liter of sodium bromide, there is obtained 4N-demethyl-4N-ethyl-6-demethylbromtetracycline.

The invention may be variously otherwise embodied within the scope of the appended claims.

What is claimed is:
1. A compound selected from the group consisting of 4N - demethyl - 4N - ethyltetracycline, 4N - demethyl-4N - ethyl(halo)tetracycline, 4N - demethyl - 4N - ethyl-6-demethyltetracycline and 4N-demethyl-4N-ethyl-6-demethyl(halo)tetracycline.
2. 4N-demethyl-4N-ethylchlortetracycline.
3. 4N-demethyl-4N-ethyl-6-demethylchlortetracycline.

References Cited

UNITED STATES PATENTS

| | | | |
|---|---|---|---|
| 3,145,154 | 8/1964 | Goodman | 195—80 |
| 3,160,570 | 12/1964 | Dulaney et al. | 195—80 |
| 3,190,810 | 6/1965 | Miller | 195—80 |
| 3,159,552 | 12/1964 | Miller | 195—80 |
| 3,172,822 | 3/1965 | Neidleman | 195—80 |
| 3,159,675 | 12/1964 | Esse et al. | 260—559 |
| 3,183,267 | 5/1965 | Blackwood et al. | 260—559 |
| 2,878,289 | 3/1959 | McCormick et al. | 260—559 |
| 3,043,875 | 7/1962 | Beereboom et al. | 260—559 |
| 3,148,212 | 9/1964 | Boothe et al. | 260—559 |

OTHER REFERENCES

Dulaney et al.: Biochimica et Biophysic Acta, vol. 60, pages 447–449, 1962.

NICHOLAS S. RIZZO, *Primary Examiner.*

HENRY R. JILES, ALEX MAZEL, *Examiners.*

J. W. ADAMS, *Assistant Examiner.*

Disclaimer 3,364,260.—*Saul L. Neidleman*, Highland Park, N.J. 4N-DEMETHYL-4N-ETHYL TETRACYCLINES. Patent dated Jan. 16, 1968. Disclaimer filed Sept. 14, 1970, by the assignee, *E. R. Squibb & Sons, Inc.*
Hereby enters this disclaimer to claim 1 of said patent.
[*Official Gazette May 25, 1971.*]